(12) United States Patent
Jung et al.

(10) Patent No.: US 8,463,633 B2
(45) Date of Patent: Jun. 11, 2013

(54) METHODS AND SYSTEMS FOR DEPLOYING A SERVICE WORKFLOW IN A HYBRID CLOUD ENVIRONMENT

(75) Inventors: Gueyoung Jung, Rochester, NY (US); Hua Liu, Fairport, NY (US); Ramses V. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 126 days.

(21) Appl. No.: 13/192,221

(22) Filed: Jul. 27, 2011

(65) Prior Publication Data

US 2013/0030859 A1     Jan. 31, 2013

(51) Int. Cl.
*G06Q 40/00*     (2012.01)
(52) U.S. Cl.
USPC .......................... 705/7.11; 705/7.42
(58) Field of Classification Search
USPC ............................... 705/7.11, 7.42
See application file for complete search history.

(56) References Cited

U.S. PATENT DOCUMENTS

| | | |
|---|---|---|
| 2012/0011077 A1* | 1/2012 | Bhagat ..................... 705/317 |
| 2012/0204169 A1* | 8/2012 | Breiter et al. ................ 717/171 |
| 2012/0204187 A1* | 8/2012 | Breiter et al. ................ 718/105 |

* cited by examiner

*Primary Examiner* — Thomas Dixon
*Assistant Examiner* — Benjamin S Fields
(74) *Attorney, Agent, or Firm* — Fox Rothschild LLP

(57) ABSTRACT

A service workflow including ordered services is received, and a heuristic utility value is calculated for each service. A best node having a smallest heuristic utility value for a service is selected, and a best node identifier is placed in a node list. If the best node includes a parallel sub-workflow, potential next nodes are identified by generating potential next nodes from a data center that can perform a service associated with the best node with a minimum run-time value. Otherwise, potential next nodes are generated based on a data center associated with the service. A heuristic utility value is determined for each potential next node, and a new best node is selected based on the heuristic utility values. The identifying, determining, and selecting operations are repeated until the best node contains only the last ordered service. Data centers for each ordered service are identified based on the best node.

17 Claims, 5 Drawing Sheets

METHODS AND SYSTEMS FOR DEPLOYING A SERVICE WORKFLOW IN A HYBRID CLOUD ENVIRONMENT

BACKGROUND

Business processes are typically designed to identify tasks to be performed in order to complete a goal. An end user can generate a business process for a particular workflow using existing tools. The user may then use a business process management (BPM) engine to map the business process into an executable service workflow.

Conventional BPM engines are designed to map a particular business process into an executable service workflow in a single data center. As such, conventional BPM engines are not designed to generate business processes that span multiple data centers, such as a hybrid cloud environment, in a way that minimizes a cost of execution while meeting quality of service requirements.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of deploying a service workflow for a business process in a hybrid cloud environment includes receiving, by a computing device, a service workflow comprising an ordered plurality of services; for each of the plurality of services, calculating, by the computing device, a heuristic utility value for the service; choosing a best node for a first service of the plurality of services having a smallest heuristic utility value; placing, by the computing device, an identifier for the best node in a node list; identifying, by the computing device, a plurality of potential next nodes by (i) selecting a data center that has a minimum run-time value from a plurality of data centers that can perform one or more services associated with the best node and generating the plurality of potential next nodes from the selected data center if the best node comprises a parallel sub-workflow, or (ii) generating the plurality of potential next nodes based on a data center associated with the service for the best node otherwise; determining, by the computing device, a heuristic utility value for each of the plurality of potential next nodes; adding, by the computing device, identifiers for the potential next nodes to the node list; selecting, by the computing device, a new best node based on the heuristic utility values associated with the nodes in the node list; repeating the identifying, determining, adding and selecting operations until the best node equals a node containing only the last service in the plurality of services; and identifying, by the computing device, one or more data centers for each service in a service workflow based on the best node.

In an embodiment, a system for deploying a service workflow for a business process includes a processor, and a processor-readable non-transitory storage medium in communication with the processor. The processor-readable non-transitory storage medium contains one or more programming instructions that, when executed, cause the processor to receive a service workflow comprising an ordered plurality of services, for each of the plurality of services, calculate a heuristic utility value for the service, choose a best node for a first service of the plurality of services having a smallest heuristic utility value, place an identifier for the best node in a node list, identify a plurality of potential next nodes by: (i) selecting a data center that has a minimum run-time value from a plurality of data centers that can perform one or more services associated with the best node and generating the plurality of potential next nodes from the selected data center if the best node comprises a parallel sub-workflow, and (ii) generating the plurality of potential next nodes based on a data center associated with the service for the best node otherwise, determine a heuristic utility value for each of the plurality of potential next nodes, select a new best node based on the heuristic utility values associated with the nodes, repeat the identifying, determining, and selecting operations until the best node equals a node containing only the last service in the plurality of services, and identify one or more data centers for each service in a service workflow based on the best node.

DETAILED DESCRIPTION

Figure 1:
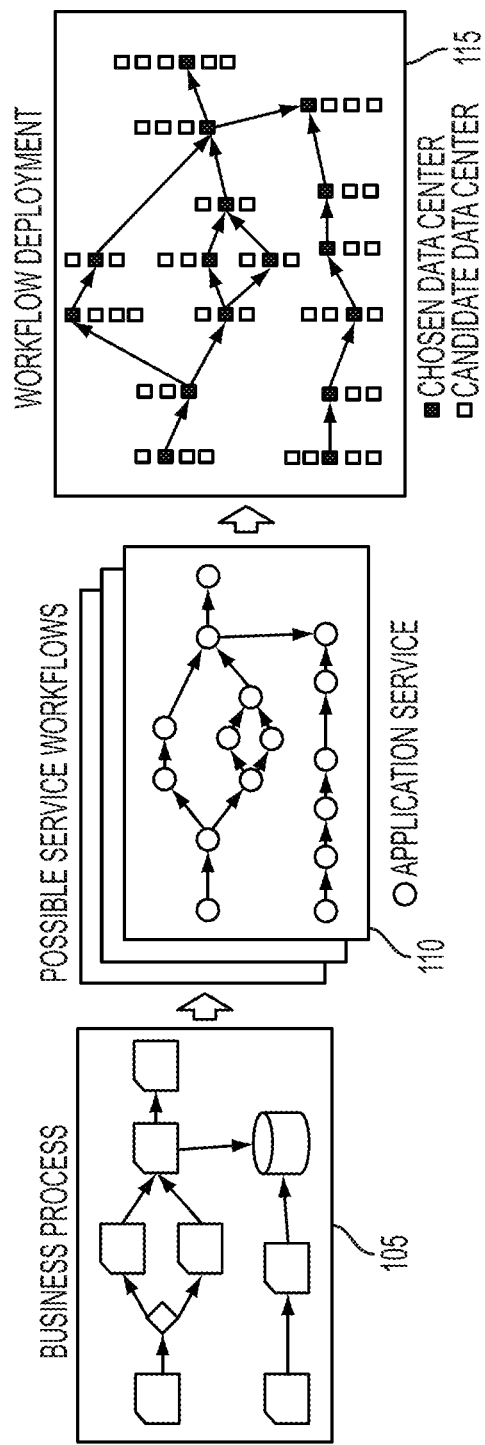
FIG. 1 depicts a block diagram of a business workflow deployment process according to an embodiment.

The following terms shall have, for the purposes of this application, the respective meanings set forth below.

A "cloud environment" refers to one or more physical and/or logical devices that operate as a shared resource. Logical devices in a cloud environment may be accessed without any knowledge of the corresponding physical devices.

A "computing device" refers to a computer, a processor and/or any other component, device or system that performs one or more operations according to one or more programming instructions. An exemplary computing device is described in reference to FIG. 5.

A "cost value" refers to a cost associated with performing one or more services. A cost value may be determined based one or more cost factors including, without limitation, a cost for using a cloud resource, a cost of purchasing a software license, a power consumption cost, a cost for wear and tear on hardware that is used to perform a particular operation, and the like. The cost may be determined on the basis of a unit of currency or any other metric in which costs are measured.

A "data center" refers to one or more computing devices, memories, and/or other peripheral devices used to perform a service.

An "edge" refers to a logical connection between nodes in a search space used to determine a best path for a workflow. As part of a best path determination, an edge between a first node and a second node may be assigned a network latency associated with a time required to traverse from a data center that is selected to perform a service associated with the first node and a data center that is selected to perform a service associated with the second node.

A "heuristic cost value" for a particular service refers to a cost value associated with performing the particular service and all services after the particular service in an ordered plurality of services for a workflow.

A "heuristic run-time value" for a particular service refers to an amount of time to complete the particular service and all services after the particular service in an ordered plurality of services for a workflow. A heuristic run-time value may not include network latencies for transitioning between nodes performing particular services.

A "heuristic utility value" for a particular service refers to a utility value associated with performing the particular service and all services after the particular service in an ordered plurality of services for a workflow. A heuristic utility value may be determined based on the heuristic cost value and the heuristic run-time value for a particular service.

A "hybrid cloud environment" refers to a cloud computing environment and/or an internal computing environment. A hybrid cloud environment may include one or more data centers located remotely from an entity for which the service workflow is performed and/or one or more data centers located in a computing environment operated by such entity.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "node" refers to a logical vertex in a search space used to determine a best path for a workflow. Each node may correspond to a data center that is capable of performing a service of a serial sub-workflow or one or more data centers that are capable of performing services of parallel sub-workflows.

A "node list" refers to a group of nodes. A node list may be formed to identify nodes that have been analyzed as part of a search algorithm.

A "physical device" is a physical resource such as a computing device, a computer-readable storage medium and/or the like.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "run-time value" refers to an amount of time required to perform one or more services. A run-time value may include an amount of time incurred as a result of network latencies between nodes performing services.

A "service" refers to a discrete operation performed as part of a workflow. A service may include, for example and without limitation, determining information, calculating a value, performing a physical operation, such as printing, scanning or the like, storing information, and/or any other operation that is typically performed as part of a workflow.

A "utility value" refers to a combined measure of the factors utilized to determine a best path of data centers for performing a workflow.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

A "workflow" or a "service workflow" refers to an ordered list of services used to perform a particular operation. A workflow or service workflow may include one or more services that can each be performed at one or more data centers in a hybrid cloud environment.

As used herein, the terms "sum," "product" and similar mathematical terms are construed broadly to include any method or algorithm in which a single datum is derived or calculated from a plurality of input data.

An optimal deployment algorithm for cloud-based service workflows is disclosed. The algorithm may be integrated into a service composition system and may be used to optimize multiple quality-of-service objectives when service workflows are deployed into hybrid cloud environments. In particular, the algorithm may be used to minimize the run time of a service workflow while minimizing the execution cost under data privacy constraints.

As described herein, the optimal deployment algorithm models deployment of complex workflows into a graph search problem. In an embodiment described herein, the A* graph search algorithm was modified to handle a mix of serial and parallel sub-workflows incurred by branching and merging nodes. As the modified A* graph search algorithm described herein explores parallel paths, it considers the temporal and cost differences between paths at each expansion to optimize the overall quality of service.

FIG. 1 depicts a block diagram of a business workflow deployment process according to an embodiment. As shown in FIG. 1, a service composition system is designed to automatically compose, deploy and manage cloud-based service workflows from a business process, such as 105. A workflow front engine in the service composition system identifies all application services corresponding to each business process service and generates multiple candidate service workflows 110 for a given business process 105. A workflow scheduler then identifies data centers that can run application services and creates a data center workflow deployment 115 for a workflow 110. A data center can run multiple different application services of a service workflow.

While many commercial BPM tools have focused on mapping a business process to a service workflow (105→110), deploying a service workflow to particular data centers in a hybrid cloud environment (110→115) is not performed by such systems. Specifically, a quality of service enabled scheduler may be used to generate workflow deployment plans by mapping given service workflows into private (internal) and/or public (cloud-based) data centers in such a way as to minimize overall workflow run-time and execution costs while meeting data privacy constraints.

When deploying workflows into a hybrid cloud environment, certain considerations should be taken into account. For example, the search algorithm should be able to deal with a very large search space. Each business process service may be implemented by one or more alternative application services. Moreover, each application service may be hosted in a plurality of private or public data centers. As the number of potential application services and candidate data centers increases, the complexity of the search space increases exponentially. As such, exploring all possible candidate deployments for a business process can be a computationally expensive process.

In addition, a plurality of quality of service metrics and constraints should be considered when determining the optimal solution. In particular, analysts intent upon deploying business processes into emerging hybrid cloud environments should consider maximizing performance of their business process while minimizing the management cost to perform the business processes. The workflow deployment algorithm described herein is designed to consider service execution time, network latency between data centers, execution cost incurred by using resource and software services, and data privacy as quality of service metrics and constraints in the optimality analysis.

Furthermore, a service workflow typically includes parallel sub-workflows with branch and merging services. Parallel sub-workflows further complicate the search problem because when choosing data centers for each of the parallel sub-workflows, the workflow scheduler should consider minimizing the run-time (i.e., execution time and network latency) variation between the sub-workflows. As a result, the overall workflow run-time may be minimized while simultaneously minimizing the sum of the execution costs for the parallel sub-workflows.

In order to address the identified challenges, the optimality search algorithm may be encoded into a shortest path search algorithm in a directed graph. The graph includes AND-branch nodes, OR-branch nodes and merging nodes. Edges have positive weights (e.g., network latency), and nodes also have positive values (e.g., execution time and cost). For given source and sink nodes, the goal of the search algorithm is to determine the shortest path from source to sink by expanding nodes. By extending the A* graph search algorithm to speed up searching data centers in a potentially large graph, the search algorithm may be used to find optimal paths in not only serial sub-workflows, but also parallel sub-workflows. Each node in a graph represents a single candidate data center in a serial sub-workflow. In a parallel sub-workflow, each node represents multiple parallel data centers. The search algorithm may expand the graph by visiting each data center that can run a corresponding service in a service workflow. While the search algorithm explores parallel paths incurred by an AND-branch, it may consider the temporal difference between paths at each extension. This may permit the scheduler to optimize the overall quality of service by considering both cost and time when comparing candidate data centers.

When the workflow scheduling algorithm explores a graph, the algorithm may predict the execution time and network latency of each candidate path to compare the path with other candidate paths until it reaches a goal node (i.e., the last node in the workflow). In an embodiment, a monitor sub-component of the scheduler may be distributed over a cloud computing system to log application service and system behaviors against workloads. For example, a monitor may record a start time stamp when a service execution engine dispatches a service and an end time stamp when the engine receives the result back from the service. The monitor may record the network latency taken from one data center to a next data center that will run a next application service of the workflow and may record prediction errors to tune future predictions.

After the monitor monitors the results (i.e., assembles the raw data from the data centers), a prediction sub-component may predict quality-of-service metrics, such as the execution time, network latency and execution cost) for each candidate path of the graph. A time series analysis methodology may be used by assuming that each service workload has a trend over time (e.g., hourly, daily, weekly, etc. More particularly, using given historical monitoring results, the prediction sub-component may build a histogram for each quality-of-service metric within a certain time interval and predict each quality-of-service metric using a weighted moving average filter. Other methods of monitoring and predicting quality-of-service metrics may be performed within the scope of this disclosure.

Figure 2:
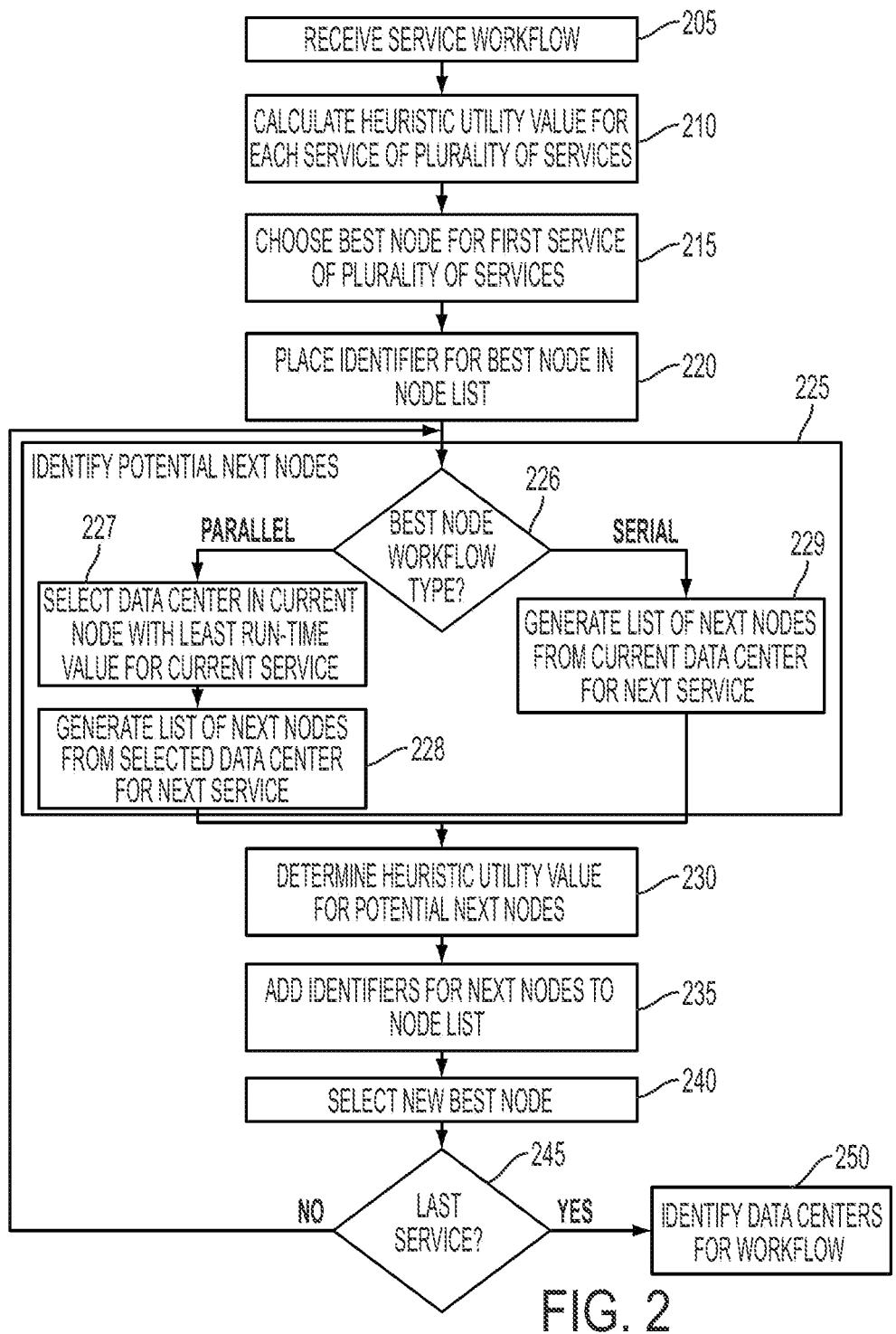
FIG. 2 depicts a flow diagram of a method of deploying a service workflow for a business process in a hybrid cloud environment according to an embodiment.

FIG. 2 depicts a flow diagram of a method of deploying a service workflow for a business process in a hybrid cloud environment according to an embodiment. As shown in FIG. 2, a computing device may receive 205 a service workflow. The service workflow may include an ordered plurality of services. In other words, one or more of the plurality of services may be required to be performed in advance of performing one or more of the other services in the plurality of services. In addition, the service workflow may include serial sub-workflows and parallel sub-workflows.

Figure 3A:
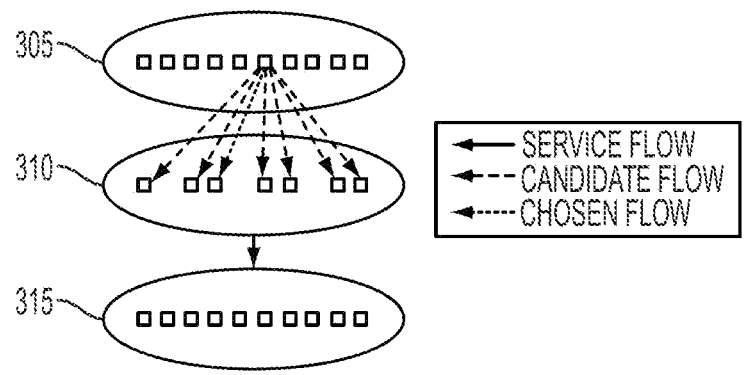
FIG. 3A depicts an exemplary serial sub-workflow of a workflow according to an embodiment.

A serial sub-workflow includes a plurality of services that are required to be performed serially. An exemplary serial sub-workflow performing three services 305, 310, 315 is disclosed in FIG. 3A.

Figure 3B:
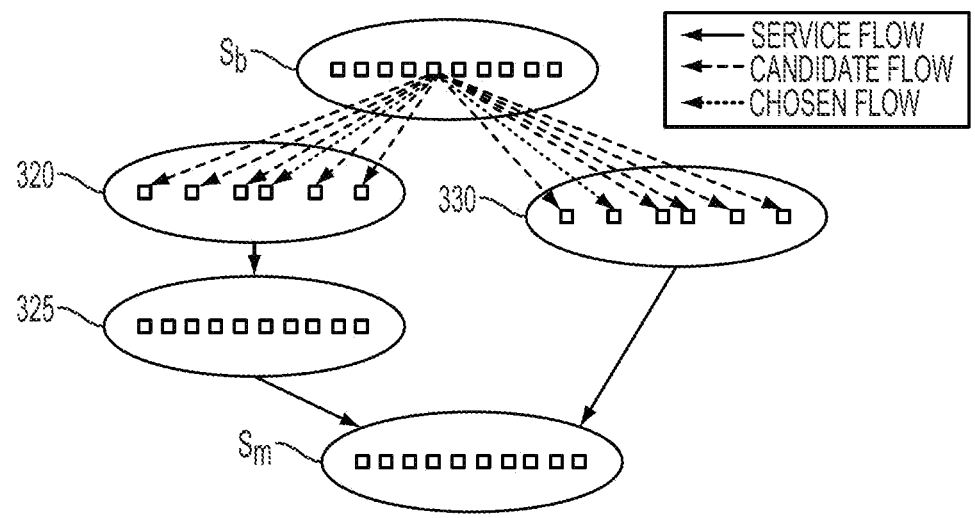
FIG. 3B depicts an exemplary parallel sub-workflow of a workflow according to an embodiment.

A parallel sub-workflow may include a branch service and a merging service and a plurality of sub-workflows between the branch service and the merging service. Each sub-workflow of the parallel sub-workflow may include a serial sub-workflow or a parallel sub-workflow. An exemplary parallel sub-workflow, including a serial sub-workflow performing two services 320, 325 and a serial sub-workflow performing one service 330, is disclosed in FIG. 3B.

Referring back to FIG. 2, the computing device may calculate 210 a heuristic utility value for each of the plurality of services. The heuristic utility value may be a quality of service measure determined based on a plurality of components, such as a cost for performing a service, an execution time required to perform a service and a network latency between the service and a next service or a previous service.

Figure 4:
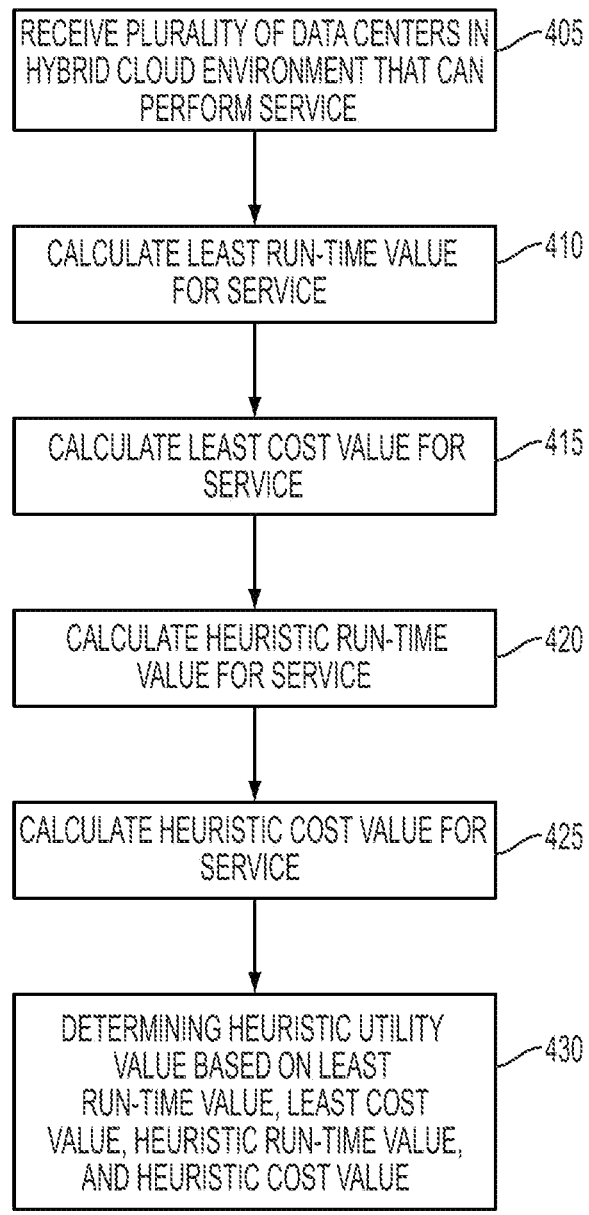
FIG. 4 depicts a method for calculating a heuristic utility value for a service according to an embodiment.

FIG. 4 depicts a method for calculating a heuristic utility value for a service according to an embodiment. As shown in FIG. 4, the heuristic utility value for the service may be calculated 210 by receiving 405 a plurality of data centers in a hybrid cloud environment that can perform the service, calculating 410 a least run-time value for the service; calculating 415 a least cost value for the service, calculating 420 a heuristic run-time value for the service, calculating 425 a heuristic cost value for the service, and determining 430 the heuristic utility value based on at least the least run-time value, the least cost value, the heuristic run-time value and the heuristic cost value for the service.

The plurality of data centers may be received 405 by identifying a list of data centers able to perform a service based on information stored in the computing device or a storage medium associated with the computing device. The plurality of data centers may include data centers having one or more capabilities used to perform one or more operations associated with a particular service. In an alternate embodiment, information may be requested and received from private data centers, public data centers or cloud computing environments regarding the capabilities of the data centers.

The least run-time value may be calculated 410 for the service based on the execution time and execution cost for each data center associated with the service and the network latency for moving to the next service. In an embodiment, the least run-time value for a service may be calculated 410 differently based on whether the service represents a serial sub-workflow (i.e., the service is performed at a non-branch node) or a parallel sub-workflow (i.e., the service is performed starting at a branch node). For a serial sub-workflow (i.e., non-branch node), the least run-time value may be calculated 410 using the following formula:

$$rt_{wf} = \sum_{j=1}^{n} \min\{et_j \text{ on } dc(s_j) | \forall\, dc(s_j) \in DC(s_j)\} + \sum_{j=1}^{n-1} \min\{nw_{j,j+1} \text{ from } dc(s_j) \text{ to } dc(s_{j+1}) | \forall\, dc(s_j) \in DC(s_j), \forall\, dc(s_{j+1}) \in DC(s_{j+1})\},$$

where $dc(s_j)$ comprises a data center for performing service $s_j$, $et_j$ on $dc(s_j)$ comprises the execution time for performing service $s_j$ on the data center j, $DC(s_j)$ comprises the set of nodes that can perform a service $s_j$, and $nw_{j,j+1}$ comprises the network delay between data center j and data center j+1, where data center j performs service $s_j$ and data center j+1 performs service $s_{j+1}$. In contrast, for a parallel workflow (i.e., branch node), the least run-time value may be calculated 410 using the following formula: $rt_{wf} = \max\{rt_{pwf} | \forall\, pwf \in PWF(s_b)\}$, where $rt_{pwf}$ comprises a run-time value for a parallel sub-workflow, and $PWF(s_b)$ comprises a set of parallel sub-workflows at branch node $s_b$. The run-time value for each parallel sub-workflow may then be calculated based on the formula for calculating the least run-time value for a serial sub-workflow.

In addition, the least cost value may be calculated 415 by setting the cost value to $c_{wf} = \Sigma \min\{c_j \text{ on } dc(s_i) | \forall\, dc(s_i) \in DC(s_i)\}$, where $c_{wf}$ comprises a cost value for a workflow, $c_j$ on $dc(s_i)$ comprises a cost for performing service $s_i$ on data center j, and $DC(s_i)$ comprises the set of nodes that can perform service $s_i$. In other words, the least cost value may be calculated 415 by summing, for each service, the cost for the data center that has the minimum cost for performing the service.

In an embodiment, the heuristic run-time value for the service may be calculated 420 by setting the heuristic run-time value to $rt^*(s_i) = rt(s_i) + rt^*(s_{i+1})$ where $rt(s_i)$ is the least run-time value for service $s_i$ and $rt^*(s_{i+1})$ is a heuristic run-time value for service $s_{i+1}$. In other words, the heuristic run-time value for a service may be calculated 420 by summing the least run-time value to perform the service and the heuristic run-time value for the next service. When calculating 420 the heuristic run-time value for the last service, the heuristic run-time value for the next (non-existent) service is 0.

In an embodiment, the least run-time value for a non-branch service may be the shortest time required for any data center to complete the service. For a branch service, the least run-time value may be determined based on the following equation: $rt(s_i) = \max\{rt_{pwf} - rt^*(s_{i+1}) | \forall\, pwf \in PWF(s_i)\}$, where $rt_{pwf}$ comprises a run-time value for a parallel sub-workflow associated with the branch service and $PWF(s_i)$ comprises a set of parallel sub-workflows for the branch service. In other words, the least run-time value for a branch service is equal to the run-time value for the slowest branch because each branch of the branch service is required to complete in order to fully perform the service.

In an embodiment, the heuristic cost value for the service may be calculated 425 by setting the heuristic cost value to $c^*(s_i) = c(s_i) + c^*(s_{i+1})$ where $c(s_i)$ is the least cost value for service $s_i$ and $c^*(s_{i+1})$ is a heuristic cost value for service $s_{i+1}$. In other words, the heuristic cost value for a service may be calculated 425 by summing the least cost value for the service and the heuristic cost value for the next service. When calculating 425 the heuristic cost value for the last service, the heuristic run-time value for the next (non-existent) service is 0.

In an embodiment, the least cost value for a non-branch service may be the lowest cost required for any data center to complete the service. For a branch service, the least cost value may be determined based on the following equation:

$$c(s_i) = \left(\sum_{pwf \in PWF(s_i)} (c_{pwf} - c^*(s_{i+1}))\right) + c^*(s_{i+1}),$$

where $c_{pwf}$ comprises a cost value for a parallel sub-workflow associated with the branch service and $PWF(s_i)$ comprises a set of parallel sub-workflows for the branch service. In other words, the least cost value for a branch service is equal to the individual least costs of performing each parallel workflow in the branch service plus the heuristic cost value of the next service.

A heuristic utility value may be determined 430 based on at least the least run-time value, the least cost value, the heuristic run-time value and the heuristic cost value for the service. The heuristic utility value may be determined 430 by setting a utility value to $u = u(dc/c(s_i)) + u^*(s_i)$, where $u(dc(s_i))$ includes a cumulative utility along a path up to data center $dc(s_i)$, and $u^*(s_i)$ is a heuristic utility value for service $s_i$ (i.e., the utility value for the services after service $s_i$). In an embodiment, determining the cumulative utility value, $u(dc(s_i))$, incorporates the network latencies between data centers.

In an embodiment, a utility value is determined using the following equation:

$$u = w_{rt}\frac{rt}{rt_{max}} + w_c\frac{c}{c_{max}},$$

where $w_{rt}$ and $w_c$ are weight values for the run-time and cost components of the utility value, $rt_{max}$ is an upper-bound run-time threshold value, and $c_{max}$ is an upper-bound cost budget value. In other words, weight values are assigned to the run-time and cost components of the utility value. In an embodiment, the weight values may be values between 0 and 1, inclusive, although any weight values may be used within the scope of this disclosure. The values $$\frac{rt}{rt_{max}} \text{ and } \frac{c}{c_{max}}$$

represent a utility value for the run-time component and a utility value for the cost component, respectively. As such, the utility value equals the sum of the product of the weight value for the run-time component and the utility value for the run-time component and the product of the weight value for the cost component and the utility value for the cost component.

Referring back to FIG. 2, a best node for a first service of a plurality of services having a smallest heuristic utility value may be chosen 215. In an embodiment, each node for the first service may have a heuristic utility value associated with it via the process described above in reference to FIG. 4. Based on these heuristic utility values, the node having a smallest heuristic utility value may be selected 215. In an embodiment, the computing device may be used to choose 215 the best node.

The computing device may place 220 an identifier for the best node in a node list. The node list may identify nodes that have already been examined as a result of the process. Each node in the node list may have an associated heuristic utility value.

The computing device may identify 225 a plurality of potential next nodes from the best node. The manner in which the plurality of next nodes is identified 225 may be based upon the type of node for the best node. For example, a determination as to whether the best node is a parallel workflow may be performed 226. If the best node comprises a parallel sub-workflow, a data center that has the smallest cumulative run-time value for the plurality of data centers that can perform a service associated with the node may be selected 227. A list of a plurality of next nodes may be generated 228 from the selected data center. Alternately, if the best node comprises a serial sub-workflow, a list of a plurality of next nodes for the current data center may be generated 229.

The computing device may determine 230 a heuristic utility value for each of the plurality of potential next nodes. Determining 230 the heuristic utility value for each of the plurality of potential next nodes may include, in response to determining that a potential next node is already listed in the node list, assigning the heuristic utility value for a potential next node to the lesser of a determined heuristic utility value for the potential next node and a previously stored heuristic utility value for the potential next node. The previously stored heuristic utility value for the potential next node may correspond to a next node that has already been examined for the purposes of determining a heuristic utility value in a previous iteration. Otherwise, the heuristic utility value for a potential next node may be a heuristic utility value determined for the potential next node during the current iteration.

The computing device may then add 235 identifiers for the potential next nodes to the node list. In an embodiment, the utility value for each potential next node may be associated with the node in the node list.

The computing device may select 240 a new best node based on the heuristic utility values associated with the nodes in the node list. The heuristic utility value for each node in the node list may represent the utility value for reaching the node from the beginning of the process. In an embodiment, the new best node may be selected 240 by sorting the node list by the heuristic utility value associated with each node in the node list and selecting the node having the smallest heuristic utility value as the new next node.

The identifying 225, determining 230, adding 235 and selecting 240 operations may be performed 245 iteratively until the selected new best node contains only a last service in the plurality of services.

If the selected new best node contains only a last service in the plurality of services, the computing device may identify 250 one or more data centers for each service in a service workflow based on the best node. In particular, the computing device stops the search and tracks back to the start node while mapping chosen data centers to services.

Figure 5:
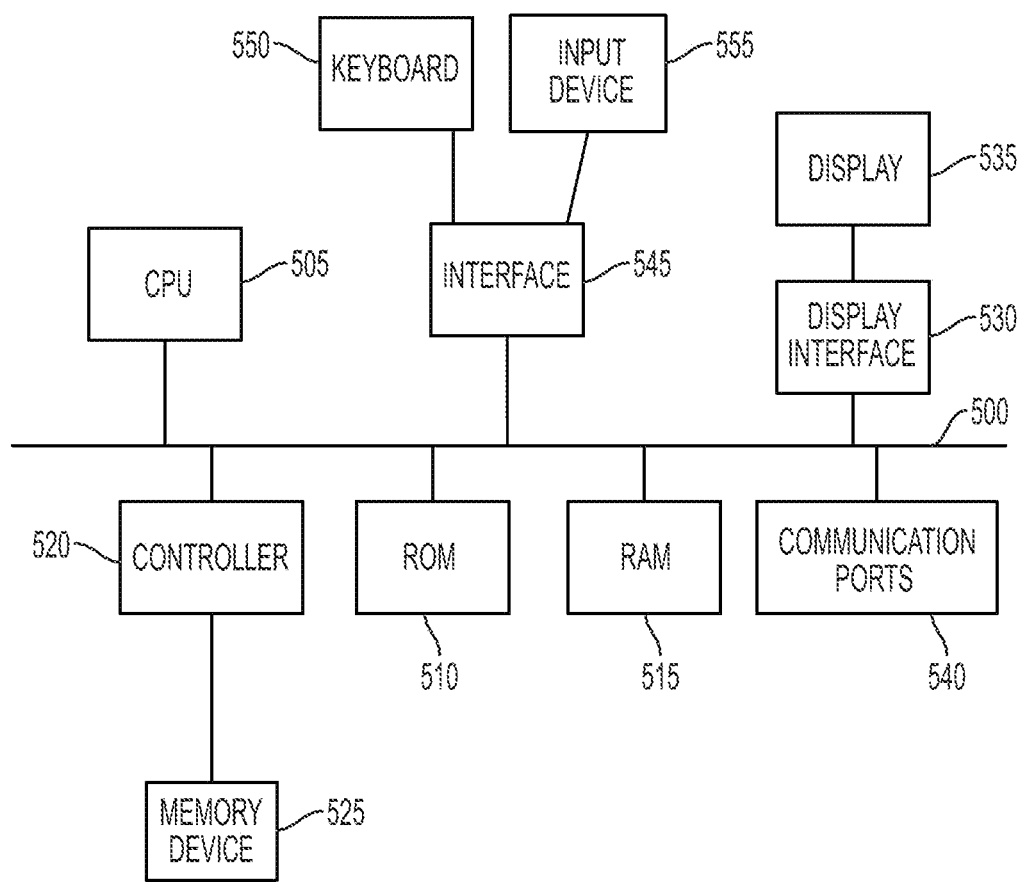
FIG. 5 depicts a block diagram of exemplary internal hardware that may be used to contain or implement program instructions according to an embodiment.

FIG. 5 depicts a block diagram of exemplary internal hardware that may be used to contain or implement program instructions, such as the process steps discussed above in reference to FIG. 1, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 530 may permit information from the bus 500 to be displayed on the display 535 in audio, visual, graphic or alphanumeric format. Communication with external devices, such as a print device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A computer-implemented method of deploying a service workflow for a business process in a hybrid cloud environment, the computer-implemented method comprising: receiving, by a computing device, a service workflow comprising an ordered plurality of services; for each of the plurality of services, calculating, by the computing device, a heuristic utility value for the service; choosing a best node for a first service of the plurality of services having a smallest heuristic utility value; placing, by the computing device, an identifier for the best node in a node list; identifying, by the computing device, a plurality of potential next nodes by: if the best node comprises a parallel sub-workflow, selecting a data center that has a minimum run-time value from a plurality of data centers that can perform one or more services associated with the best node and generating the plurality of potential next nodes from the selected data center, and otherwise, generating the plurality of potential next nodes based on a data center associated with the service for the best node; determining, by the computing device, a heuristic utility value for each of the plurality of potential next nodes; adding, by the computing device, identifiers for the potential next nodes to the node list; selecting, by the computing device, a new best node based on the heuristic utility values associated with the nodes in the node list; repeating the identifying, determining, adding and selecting operations until the best node equals a node containing only the last service in the plurality of services; and identifying, by the computing device, one or more data centers for each service in a service workflow based on the best node.

2. The method of claim 1, wherein calculating a heuristic utility value for the service comprises:
receiving, by the computing device, a plurality of data centers in a hybrid cloud environment that can perform the service;
calculating a least run-time value, a least cost value, a heuristic run-time value and a heuristic cost value for the service; and
determining the heuristic utility value based on at least the least run-time value, the least cost value, the heuristic run-time value and the heuristic cost value for the service.

3. The method of claim 2, wherein calculating a least run-time value comprises setting the run-time value for a non-branch node to $$rt_{wf} = \sum_{j=1}^{n} \min\{et_j \text{ on } dc(s_i) | \forall\, dc(s_i) \in DC(s_i)\} + \sum_{j=1}^{n-1} \min\{nw_{j,k} \text{ from } dc(s_i) \text{ to } dc(s_{i+1}) | \forall\, dc(s_i) \in DC(s_i),$$

$$\forall\, dc(s_{i+1}) \in DC(s_{i+1})\},$$

where $dc(s_i)$ comprises a data center for performing service $s_i$, $et_j$ on $dc(s_i)$ comprises the execution time for performing service $s_i$ on the data center j, $DC(s_i)$ comprises the set of nodes that can perform a service $s_i$, and $nw_{j,k}$ comprises the network delay between data center j and data center k, where data center j performs service $s_i$ and data center k performs service $s_{i+1}$.

4. The method of claim 2, wherein calculating a least run-time value comprises setting the run-time value at a branch node to $rt_{wf} = \max\{rt_{pwf} | \forall pwf \in PWF(s_b)\}$, where $rt_{pwf}$ comprises a run-time value for a parallel sub-workflow, and $PWF(s_b)$ comprises a set of parallel sub-workflows at branch node $s_b$.

5. The method of claim 2, wherein calculating a least cost value comprises setting the cost value to $c_{wf} = \Sigma \min\{c_j$ on $dc(s_i) | \forall dc(s_i) \in DC(s_i)\}$, where $c_{wf}$ comprises a cost value for a workflow, $c_j$ on $dc(s_i)$ comprises a cost for performing service $s_i$ on data center j, and $DC(s_i)$ comprises the set of nodes that can perform service $s_i$.

6. The method of claim 2, wherein calculating a heuristic run-time value comprises setting the heuristic run-time value to $rt^*(s_i) = rt(s_i) + rt^*(s_{i+1})$, wherein $rt(s_i)$ is the least run-time value for service $s_i$ and $rt^*(s_{i+1})$ is a heuristic run-time value for service $s_{i+1}$.

7. The method of claim 6, wherein the least run-time value is determined based on the following equation if service $s_i$ is a branch service: $rt(s_i) = \max\{rt_{pwf} - rt^*(s_{i+1}) | \forall pwf \in PWF(s_i)\}$, wherein $rt_{pwf}$ comprises a run-time value for a parallel sub-workflow associated with the branch service and $PWF(s_i)$ comprises a set of parallel sub-workflows for the branch service.

8. The method of claim 2, wherein calculating a heuristic cost value comprises setting the heuristic cost value to $c^*(s_i) = c(s_i) + c^*(s_{i+1})$, wherein $c(s_i)$ is the least cost value for service $s_i$ and $c^*(s_{i+1})$ is a heuristic cost value for service $s_{i+1}$.

9. The method of claim 8, wherein the least cost value is determined based on the following equation if service $s_i$ is a branch service:

$$c(s_i) = \left( \sum_{pwf \in PWF(s_i)} (c_{pwf} - c^*(s_{i+1})) \right) + c^*(s_{i=1}),$$

wherein $c_{pwf}$ comprises a cost value for a parallel sub-workflow associated with the branch service and $PWF(s_i)$ comprises a set of parallel sub-workflows for the branch service.

10. The method of claim 2, wherein determining the heuristic utility value comprises setting a utility value to $u = u(dc(s_i)) + u^*(s_i)$, wherein $u(dc(s_i))$ comprises a cumulative utility along a path up to data center $dc(s_i)$, and $u^*(s_i)$ is a heuristic utility value for service $s_i$.

11. The method of claim 10, wherein the utility value is determined based on the following equation $$u = w_{rt} \frac{rt}{rt_{max}} + w_c \frac{c}{c_{max}},$$

wherein $w_{rt}$ and $w_c$ are weight values for the run-time and cost components of the utility value, $rt_{max}$ is an upper-bound run-time threshold value, and $c_{max}$ is an upper-bound cost budget value.

12. The method of claim 1, wherein determining a heuristic utility value for each of the plurality of next nodes comprises assigning the heuristic utility value for a potential next node to the lesser of a determined heuristic utility value for the potential next node and a previously stored heuristic utility value for the potential next node in response to determining that the potential next node is listed in the node list.

13. The method of claim 1 wherein selecting a best node comprises:
sorting, by the computing device, the node list by the heuristic utility value associated with each node in the node list; and
selecting, by the computing device, the node having the smallest heuristic utility value to be the best node.

14. A system for deploying a service workflow for a business process, the system comprising:
a processor;
a processor-readable non-transitory storage medium in communication with the processor, wherein the processor-readable non-transitory storage medium contains one or more programming instructions that, when executed, cause the processor to:
receive a service workflow comprising an ordered plurality of services,
for each of the plurality of services, calculate a heuristic utility value for the service,
choose a best node for a first service of the plurality of services having a smallest heuristic utility value,
place an identifier for the best node in a node list,
identify a plurality of potential next nodes by:
if the best node comprises a parallel sub-workflow, selecting a data center that has a minimum run-time value from a plurality of data centers that can perform one or more services associated with the best node and generating the plurality of potential next nodes from the selected data center, and
otherwise, generating the plurality of potential next nodes based on a data center associated with the service for the best node, determine a heuristic utility value for each of the plurality of potential next nodes, select a new best node based on the heuristic utility values associated with the nodes, repeat the identifying, determining, and selecting operations until the best node equals a node containing only the last service in the plurality of services, and identify one or more data centers for each service in a service workflow based on the best node.

15. The system of claim 14, wherein the one or more programming instructions that, when executed, cause the processor to calculate a heuristic utility value for the service comprise one or more programming instructions that, when executed, cause the processor to:

receive a plurality of data centers in a hybrid cloud environment that can perform the service;

calculate a least run-time value and a least cost value for the service;

calculate a heuristic run-time value and a heuristic cost value for the service; and determine the heuristic utility value based on at least the least run-time value, the least cost value, the heuristic run-time value and the heuristic cost value for the service.

16. The system of claim 14, wherein the one or more programming instructions that, when executed, cause the processor to determine a heuristic utility value for each of the plurality of next nodes comprise one or more programming instructions that, when executed, cause the processor to:

assign the heuristic utility value for a potential next node to the smaller of a determined heuristic utility value for the potential next node and a previously stored heuristic utility value for the potential next node in response to determining that the potential next node is listed in the node list.

17. The system of claim 14 wherein the one or more programming instructions that, when executed, cause the processor to select a best node comprise one or more programming instructions that, when executed, cause the processor to:

add identifiers for the potential next nodes to the node list;

sort the node list by the heuristic utility value associated with each node in the node list; and select the node having the smallest heuristic utility value to be the best node.

* * * * *